(12) United States Patent
Roeck et al.

(10) Patent No.: US 8,117,600 B1
(45) Date of Patent: Feb. 14, 2012

(54) SYSTEM AND METHOD FOR DETECTING IN-LINE SYNCHRONIZATION PRIMITIVES IN BINARY APPLICATIONS

(75) Inventors: Guenter E. Roeck, San Jose, CA (US); Serge Shats, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1303 days.

(21) Appl. No.: 11/321,460

(22) Filed: Dec. 29, 2005

(51) Int. Cl.
G06F 9/44 (2006.01)
G06F 9/45 (2006.01)
G06F 11/00 (2006.01)

(52) U.S. Cl. ....... 717/128; 717/129; 717/136; 714/38.1; 714/45

(58) Field of Classification Search .................. 717/127; 712/108, 216; 710/200; 707/8; 711/147
See application file for complete search history.

(56) References Cited

U.S. PATENT DOCUMENTS

| | | | |
|---|---|---|---|
| 4,718,008 A | 1/1988 | Chang | |
| 4,868,738 A | 9/1989 | Kish | |
| 5,280,611 A | 1/1994 | Mohan | |
| 5,282,274 A | 1/1994 | Liu | |
| 5,740,440 A * | 4/1998 | West | 717/125 |
| 5,802,585 A * | 9/1998 | Scales et al. | 711/154 |
| 6,014,513 A * | 1/2000 | Voelker et al. | 717/131 |
| 6,101,524 A | 8/2000 | Choi | |
| 6,158,024 A * | 12/2000 | Mandal | 714/37 |
| 6,243,793 B1 | 6/2001 | Aucsmith | |
| 6,408,305 B1 | 6/2002 | Stoodley | |
| 6,625,635 B1 | 9/2003 | Elnozahy | |
| 6,728,950 B2 * | 4/2004 | Davis et al. | 717/136 |
| 6,820,218 B1 | 11/2004 | Barga | |
| 6,832,367 B1 | 12/2004 | Choi | |
| 6,848,106 B1 | 1/2005 | Hipp | |
| 6,850,945 B2 | 2/2005 | Lanzatella | |
| 6,854,108 B1 | 2/2005 | Choi | |
| 7,093,162 B2 | 8/2006 | Barga | |
| 7,251,745 B2 | 7/2007 | Koch | |
| 7,506,318 B1 * | 3/2009 | Lindo et al. | 717/130 |
| 2002/0087843 A1 | 7/2002 | Kottapalli | |
| 2002/0133675 A1 | 9/2002 | Hirayama | |
| 2003/0212983 A1 | 11/2003 | Tinker | |
| 2004/0221272 A1 * | 11/2004 | Wu et al. | 717/128 |
| 2004/0255182 A1 | 12/2004 | Lomet | |
| 2006/0026387 A1 * | 2/2006 | Dinechin et al. | 712/1 |
| 2006/0150183 A1 | 7/2006 | Chinya | |

OTHER PUBLICATIONS

Schwarz, B., et al., Disassembly of Executable Code Revisited, Proceedings of the Ninth Working Conference on Reverse Engineering, 2002, pp. 45-54.*

(Continued)

*Primary Examiner* — Tuan Dam
*Assistant Examiner* — Todd Aguilera
(74) *Attorney, Agent, or Firm* — Meyertons, Hood, Kivlin, Kowert & Goetzel, P.C.

(57) ABSTRACT

A system, method, and computer-accessible medium are disclosed for identifying in-line synchronization instructions in binary program code. One or more executable segments of the binary program code may be scanned to identify one or more potential in-line synchronization instructions. For each potential in-line synchronization instruction, it may be determined whether neighboring potential instructions are valid instructions. For each potential in-line synchronization instruction, it may be determined that the potential in-line synchronization instruction is a valid in-line synchronization instruction if the neighboring potential instructions are valid instructions.

13 Claims, 14 Drawing Sheets

OTHER PUBLICATIONS

Schwarz, B., et al., Disassembly of Executable Code Revisted, Proceeding of the Ninth Working Conference on Reverse Engineering [online], 2002 [retrieved Mar. 15, 2011], Retrived from Internet <http://ieeexplore.ieee.org/stamp/stamp.jsp?tp=&arnumber=1173063>, pp. 45-54.*

U.S. Appl. No. 11/240,966, entitled "System and Method for Detecting and Logging In-line Synchronization Primitives in Application Program Code", filed Sep. 30, 2005.

U.S. Appl. No. 11/324,457, entitled "System and Method for Logging and Replaying Accesses to Shared Memory", filed Dec. 29, 2005.

U.S. Appl. No. 11/321,458, entitled "System and Method for Deterministic Operation and Playback of Binary Applications with Inline Latches and Spinlocks", filed Dec. 29, 2005.

Netzer: "Optimal Tracing and Replay for Debugging Shared-Memory Parallel Programs;" Workshop on Parallel & Distributed Debugging; Proceedings of the 1993 ACM/ONR Workshop on Parallel and Distributed Debugging; San Diego, California, pp. 1-11; 1993; ISBN:0-89791-633-6.

Ronsse, et al., "RecPlay: a Fully Integrated Practical Record/Replay System," ACM Transactions on Computer Systems, vol. 17, No. 2, pp. 133-152, May 1999.

* cited by examiner

SYSTEM AND METHOD FOR DETECTING IN-LINE SYNCHRONIZATION PRIMITIVES IN BINARY APPLICATIONS

BACKGROUND

1. Field of the Invention

This invention relates to enterprise system management and, more particularly, to continuous availability techniques in multi-server networked environments.

2. Description of the Related Art

The impact of system downtime on productivity is increasing as organizations rely more heavily on information technology. Consequently, organizations may seem to minimize downtime through various approaches designed to increase reliability and availability. Ultimately, the goal of many organizations is to ensure the continuous availability of critical systems.

One approach to continuous availability is the use of redundant hardware executing redundant instances of an application in lockstep. If one instance of an application on one unit of hardware fails, then the instance on the other unit of hardware may continue to operate. However, the redundant hardware is often proprietary, and both the redundant and proprietary natures of the hardware yield a cost that may be prohibitive.

To avoid the expense of special-purpose hardware, software techniques may be used to provide failover of an application. For example, cluster management software may support application failover in a networked environment having two or more servers and a shared storage device. If the failure of an application or its host server is sensed, then a new instance of the application may be started on a functioning server in the cluster. However, software-based failover approaches may fail to preserve the entire context of the application instance on the failed server up to the moment of failure. In the wake of a failure, the new instance of the application is typically started anew. In the process, recent transactions and events may be discarded. Other transactions and events may be left in an indeterminate state. The server or its clients may need to initiate new connections to replace connections lost in the failover.

Debugging software has used techniques for the logging and replay of events encountered by an application. For example, a debugger may log events occurring during execution of a first instance of an application. The debugger may then replay the logged events from the beginning by means of instrumentation of the application, typically using recompilation or other techniques prior to replay. However, recompilation may not be available for off-the-shelf application software, and static instrumentation may often yield an unacceptable performance penalty for software in a production environment.

It is desirable to provide improved methods and systems for continuously available execution environments.

SUMMARY

A system, method, and computer-accessible medium are disclosed for identifying in-line synchronization instructions in binary program code by analysis of neighboring data. The method may include scanning one or more executable segments of the binary program code to identify one or more potential in-line synchronization instructions. In one embodiment, a potential in-line synchronization instruction may be identified by matching it against a set of known synchronization instructions for the target platform. In one embodiment, a potential in-line synchronization instruction may be identified by creating and analyzing a graph of possibilities for each candidate phrase found in the binary program code. Because a potential in-line synchronization instruction found in the binary program code may actually comprise non-executable data instead of a valid, executable instruction, further analysis may be performed.

After identifying a potential in-line synchronization instruction, the method may further include determining whether neighboring potential instructions are valid instructions. The neighboring potential instructions may comprise information in the binary program code which is located in the vicinity of the potential in-line synchronization instruction. As with the potential in-line synchronization instruction, the neighboring potential instructions may actually comprise non-executable data rather than valid, executable instructions. If it is determined that the neighboring potential instructions are valid instructions, then the method may include determining that the potential in-line synchronization instruction is a valid in-line synchronization instruction.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 14:
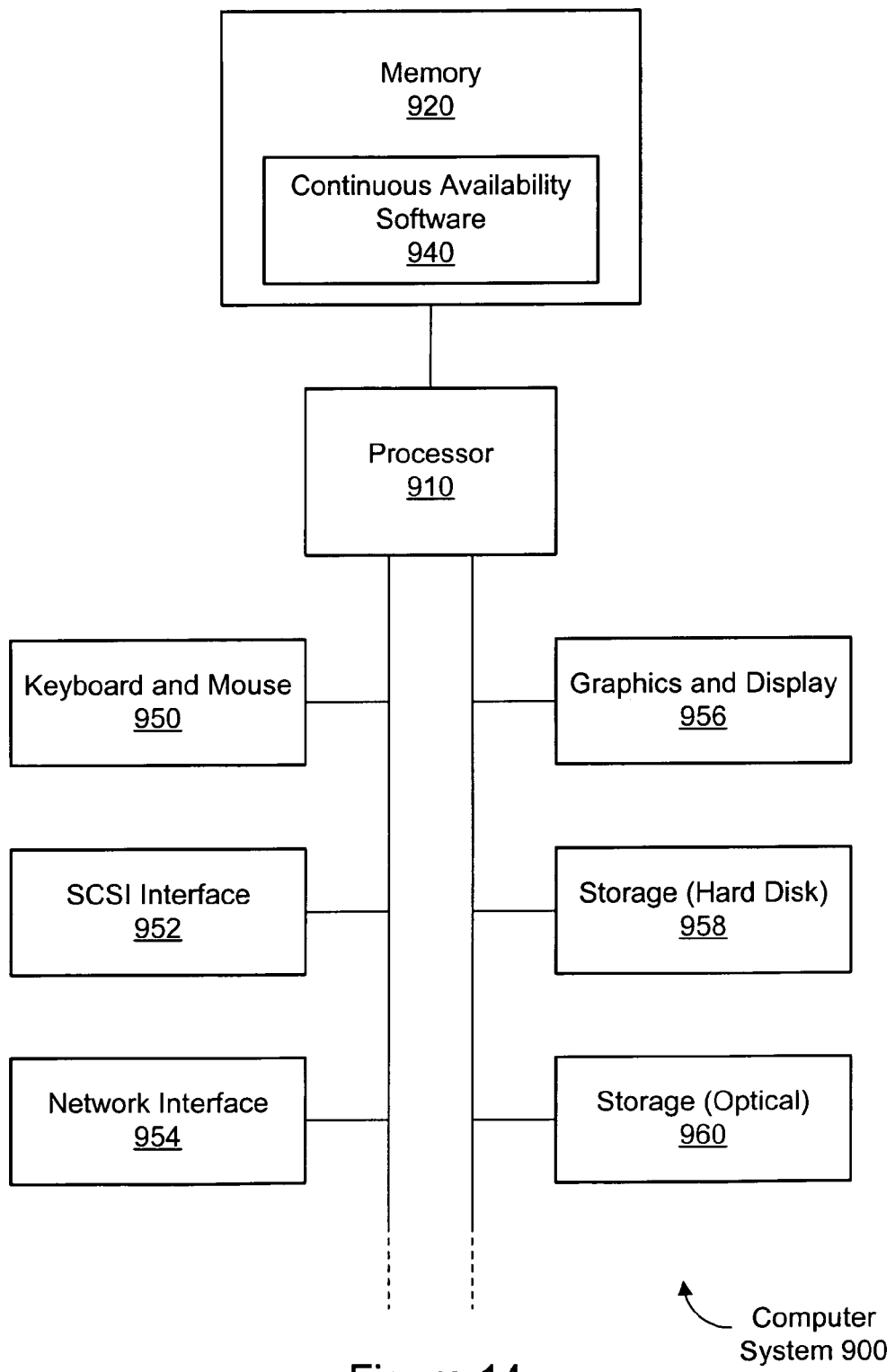
FIG. 14 illustrates a block diagram of a typical computer system for implementing embodiments of the systems and methods described above.

Using the systems, methods, and computer-accessible media described herein, identification of in-line synchronization instructions or other atomic operations in binary program code may be provided. The identification, logging, and/or replay of in-line synchronization primitives may be used to preserve and duplicate application context in a continuously available execution environment. FIGS. 1, 2, 4, 6, and 9 illustrate examples of multi-server networked environments which may be used with the systems, methods, and computer-accessible media described herein. FIG. 14 illustrates an example of a computer system which may be used with the systems, methods, and computer-accessible media described herein. The example configurations shown in FIGS. 1, 2, 4, 6, 9, and 14, and the quantity and kind of elements shown therein, are intended to be illustrative rather than limiting, and other embodiments are possible and contemplated.

As used herein, the term "server(s)" or "servers(s) 102" may refer collectively to any of the servers 102A-102K illustrated in FIGS. 1, 2, 4, 6, and 9. Servers 102 may also be referred to herein as "hosts." As used herein, the term "client(s)" or "client(s) 110" may refer collectively to any of the clients 110A-110E illustrated in FIGS. 1, 2, 4, 6, and 9. As used herein, the term "storage device(s)" or "storage device(s) 130" may refer collectively to any of the storage devices 130A-130E illustrated in FIGS. 1, 2, 4, 6, and 9. As used herein, the term "application(s)" or "application(s) 104" may refer collectively to any of the application instances 104A-104K illustrated in FIGS. 1, 2, 4, 6, and 9. As used herein, the term "application state(s)" or "application state(s) 103" may refer collectively to any of the application states 103A, 103C, 103E, 103G, 103J illustrated in FIGS. 1, 2, 4, 6, and 9. As used herein, the term "multi-server networked environment(s)" may refer collectively to any of the multi-server networked environments 100, 200, 400, 600, 1000 illustrated in FIGS. 1, 2, 4, 6, and 9. As used herein, the term "log(s)" or "log(s) 134" may refer collectively to any of the logs 134C, 134E, 134G, 134J illustrated in FIGS. 2, 4, 6, and 9. As used herein, the term "application snapshot(s)" or "application snapshot(s) 132" may refer collectively to any of the application snapshots 132C, 132E, 132G, 132J illustrated in FIGS. 2, 4, 6, and 9. As used herein, the term "file system snapshot(s)" or "file system snapshot(s) 133" may refer collectively to any of the file system snapshots 133C, 133E, 133G, 133J illustrated in FIGS. 2, 4, 6, and 9. As used herein, the term "in-line synchronization primitive(s)" or "in-line synchronization primitive(s) 106" may refer collectively to any of the in-line synchronization primitives 106E, 106G illustrated in FIGS. 4 and 6.

Figure 1:
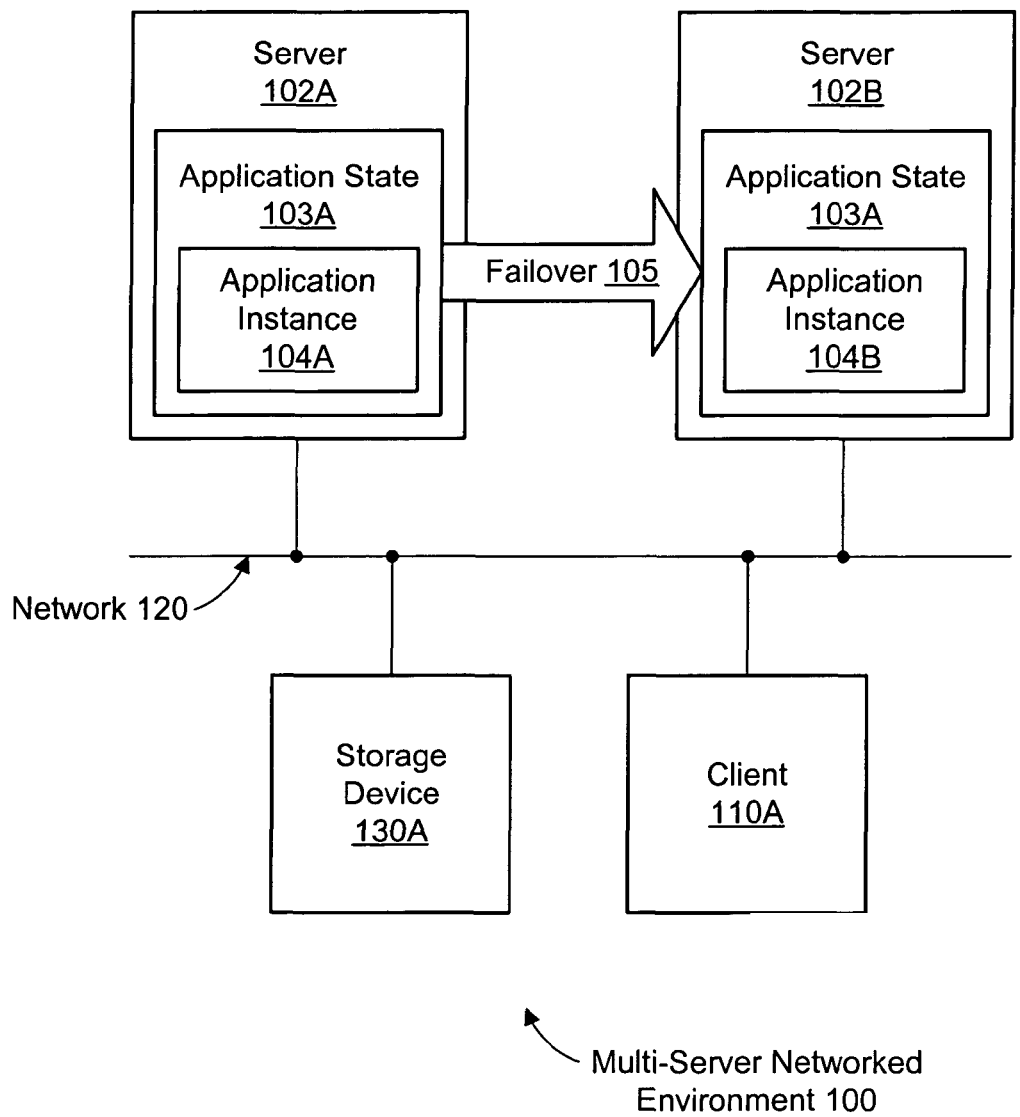
FIG. 1 illustrates a multi-server networked environment including failover according to one embodiment.

FIG. 1 illustrates a multi-server networked environment 100 including failover according to one embodiment. The multi-server networked environment 100 may be used to provide a continuously available execution environment including failover 105 for one or more applications 104. If one server 102A fails, the execution environment may be recreated on another server 102B such that the application state 103A immediately prior to the failure is duplicated. The application state 103A may include execution state, memory state, transaction state, open network connections, open files, and any other parameters and context necessary to resume execution of the application 104 in a deterministic manner. By duplicating the application state 103A of one application instance 104A to another application instance 104B using failover techniques 105, the application 104 may continue execution in a manner that is transparent to one or more clients 110. In addition to the failover scenario, the systems, methods, and computer-accessible media disclosed herein may also be used to perform a planned migration of an application from one server to another.

The continuously available execution environment may also be referred to as "software fault tolerance" or "application virtualization." In one embodiment, applications may be encapsulated in a virtual environment in which exchanges of data with the operating system and with other external processes are monitored. The virtual environment may include the virtualization of network addresses, process IDs, thread IDs, semaphore IDs, and other addresses and identifiers which link the application to external resources. In one embodiment, the continuously available execution environment may be implemented primarily in software, i.e., without using redundant propriety hardware executing in lockstep. In one embodiment, the continuously available execution environment may be implemented without recompilation of an operating system kernel. In one embodiment, the continuously available execution environment may be implemented without static recompilation of applications 104. In one embodiment, the continuously available execution environment may be implemented without modification of clients 110, and the failover 105 may be transparent to clients 110. The continuously available execution environment may also be used for migration of applications 104 from server to server (e.g., for maintenance or performance reasons).

In the example shown in FIG. 1, the multi-server networked environment 100 includes a storage device 130A coupled to a network 120. Various embodiments of the multi-server networked environments discussed herein may include various quantities and types of storage devices. Storage devices may include any of various types of storage devices including, but not limited to, storage systems such as RAID (Redundant Array of Independent Disks) systems, disk arrays, JBODs (Just a Bunch Of Disks, used to refer to disks that are not configured according to RAID), and other suitable storage devices.

In various embodiments, the network 120 may comprise any local area network (LAN) such as an intranet or any wide area network (WAN) such as the Internet. The network 120 may use a variety of wired or wireless connection media. Wired connection media may include, for example, Ethernet, Fiber Channel media, or another sufficiently fast connection media. Wireless connection media may include, for example, a satellite link, a modem link through a cellular service, or a wireless link such as Wi-Fi.

In various embodiments, the multi-server networked environment 100 may employ any of a number of commercially available software products for continuous availability, such as, for example, various products available from VERITAS Software Corporation (Mountain View, Calif.). The software products for continuous availability may be installed and executed on servers 102 which are coupled to the network 120. In one embodiment, the software products for continuous availability may operate transparently to the servers 102, and/or applications 104. In various embodiments, the multi-server networked environment 100 may also employ any of a number of commercially available software products for storage management, such as, for example, various products available from VERITAS Software Corporation (Mountain View, Calif.). The storage management software may provide functionality such as cluster management, volume management, storage virtualization, and/or file system management to organize data on one or more storage devices 130 and/or provide storage access to servers 102 and clients 110.

In one embodiment, FIG. 1 may illustrate a Network-Attached Storage (NAS) environment. In a NAS environment, storage devices 130 may be directly attached to a network 120 (such as a local area network) using standard network protocols and may serve files to consumers on the network 120. In one embodiment, FIG. 1 may illustrate a Storage Area Network (SAN) environment. The SAN environment may comprise a dedicated storage network in which servers 102 and subsystems (e.g., switches) collaborate to manage the movement and storage of data on storage devices 130. The hardware (e.g., switches, hubs, bridges, routers, cables, etc.) that connects servers 102 to storage devices 130 in a SAN is referred to as a "disk fabric" or "fabric." In a SAN environment, clients 110 may send data to and receive data from the servers 102 over a local area network instead of communicating directly with the storage devices 130. In one embodiment, FIG. 1 may illustrate a cluster file system environment. A cluster file system may enable concurrent file access to a single storage device 130 from multiple servers 102. Clusters may also provide high availability, load balancing, and/or parallel processing.

Figure 2:
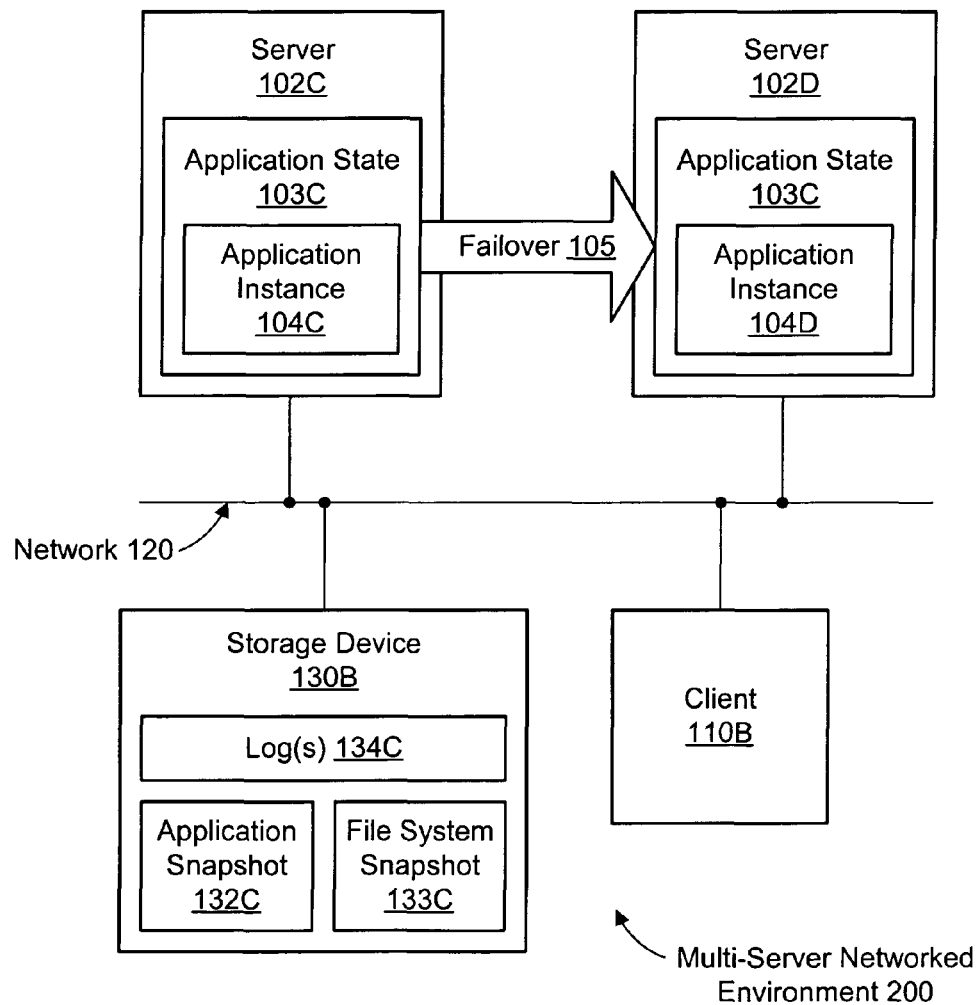
FIG. 2 illustrates a multi-server networked environment including failover based on capturing and restoring a file system snapshot, application snapshot, and log of events according to one embodiment.

In order to capture the application state 103 at a point in time at or immediately prior to the point of failure, sufficient data about the application state 103 may be stored on a routine basis to enable deterministic and transparent restoration of the application state 103. The stored data may include, for example, various combinations of an application snapshot, a file system snapshot, and/or a log of events. FIG. 2 illustrates a multi-server networked environment 200 including failover based on capturing and restoring a file system snapshot, application snapshot, and log of events according to one embodiment. The application state 103C of a first instance 104C (e.g., on a first server 102C) may be preserved and then restored to a second instance 104D (e.g., on a second server 102D) using an application snapshot 132C, file system snapshot 133C, and log(s) 134C. The application snapshot 132C, file system snapshot 133C, and log(s) 134C may be stored on one or more storage devices (e.g., storage device 130B) which are accessible to both servers 102C, 102D.

The application snapshot 132C may comprise application state data such as the execution state, memory state, transaction state, open network connections, open files, and other suitable state-related data for the application instance 104C at a particular point in time. In one embodiment, an application snapshot may be generated at a regular interval (e.g., once per minute). Generation of the application snapshot may comprise freezing all application-related processes, draining I/O queues and buffers, taking a memory snapshot of all application-related processes, taking a memory snapshot of relevant kernel resources (e.g., open files, TCP endpoints, semaphores, etc.), storing the data to disk, and unfreezing the application. Further aspects regarding possible implementations of application snapshots are described in U.S. Pat. No. 6,848,106, which is incorporated herein by reference.

The multi-server networked environment 200 may include an application snapshot/restore framework which processes transactions between the operating system and the applications 104. In one embodiment, application states may be tracked via library and kernel interposition using the application snapshot/restore framework. Requests for system resources or changes to process state may be routed internally, and the application snapshot/restore framework may track these events in anticipation of an application snapshot 132C. The application snapshot/restore framework may be transparent to running (and snapshotted) applications 104 such that an application is always running from the application's perspective. An application snapshot 132C may comprise multiple processes and multiple threads and may include shared resources in use by a process, such as shared memory or semaphores. A process may be snapshotted and restored more than once. In one embodiment, all processes that are snapshotted together in the form of an application chain may share the same application ID ("AID"). As used herein, an application chain is the logical grouping of a set of applications and processes that communicate with each other and share resources to provide a common function.

In one embodiment, a virtual environment may comprise a layer that resides between the applications 104 and the operating system. Resource handles may be abstracted to present a consistent view to the application 104, but the actual system resource handles may change as an application is snapshotted or restored more than once. The virtual environment may also allow multiple applications to compete for the same resources, where exclusion might normally prohibit such behavior, to allow multiple snapshots to coexist without reconfiguration. The virtual environment may comprise a preload library which interposes between an application and the operating system for the purpose of intercepting and handling library calls and system calls. Once the library has been preloaded, it may be attached to the address space of a process. The preload library may operate in "user mode" (i.e., non-kernel and non-privileged mode). Application programming interface (API) calls to modify the state of the application may be made from the application 104 to the operating system API interfaces via the application snapshot/restore framework or the preload library. The preload library may save the state of various resources by intercepting API interface calls and then save the state at a pre-arranged memory location. When the memory of a process is saved as part of the snapshot/restore mechanism, this state may be saved since it resides in memory. The state may be saved to non-volatile storage (i.e., a file on disk). The preload library may notify the snapshot/restore framework through a private interface.

The file system snapshot 133C may comprise file system data or storage data such as contents and metadata of a file system at a particular point in time. The file system snapshot 133C may also be referred to as a "disk snapshot" or "frozen image." The file system represented by the file system snapshot may be used by the application instance 104C, e.g., for storage of application-related data. In one embodiment, a file system snapshot may be generated at a regular interval (e.g., once per minute). In one embodiment, the file system snapshot 133C may represent one or more file system snapshots for a plurality of file systems used by the application instance 104C. In one embodiment, the file system snapshot 133C may include only a relevant subset of any file system used by the application instance 104C, such as one or more specific volumes, directories, and/or files. Further aspects regarding possible implementations of file system snapshots are described in U.S. Pat. No. 6,850,945, which is incorporated herein by reference.

Because snapshots are too resource-intensive to be taken after every event that changes the application state 103C, one or more logs 134C may be used to store data between snapshots which alters the application state 103C. The log(s) 134C may comprise any events that are capable of introducing non-determinism into program execution, including their original sequence and original results. For example, a log 134C may comprise a record of events and results such as transaction requests from clients 110B of the application, interprocess communication events, TCP/IP events, other file I/O, system calls for random number generation, system calls for a date or time, attempts to acquire semaphores, signal execution, etc. In one embodiment, the log(s) 134C may comprise both synchronous and asynchronous events. After restoring the state-related data in the application snapshot 132C and the file system data in the file system snapshot 133C, the entries in the log 134C may be "replayed" (i.e., encountered in the same order and with the same results as originally experienced) to restore the application state 103C and continue execution from the point of failure. In one embodiment, replaying the log entries may comprise ensuring that function calls return the original value, that sequences produce the original result, that read operations return the original results of the original size, that signal execution occurs at the same location as in the original process, that semaphores are acquired in the original sequence, etc. To ensure the original results, replaying some log entries may therefore comprise simulating execution of particular events (e.g., through interception of kernel functions) rather than re-executing the events per se.

Figure 3:
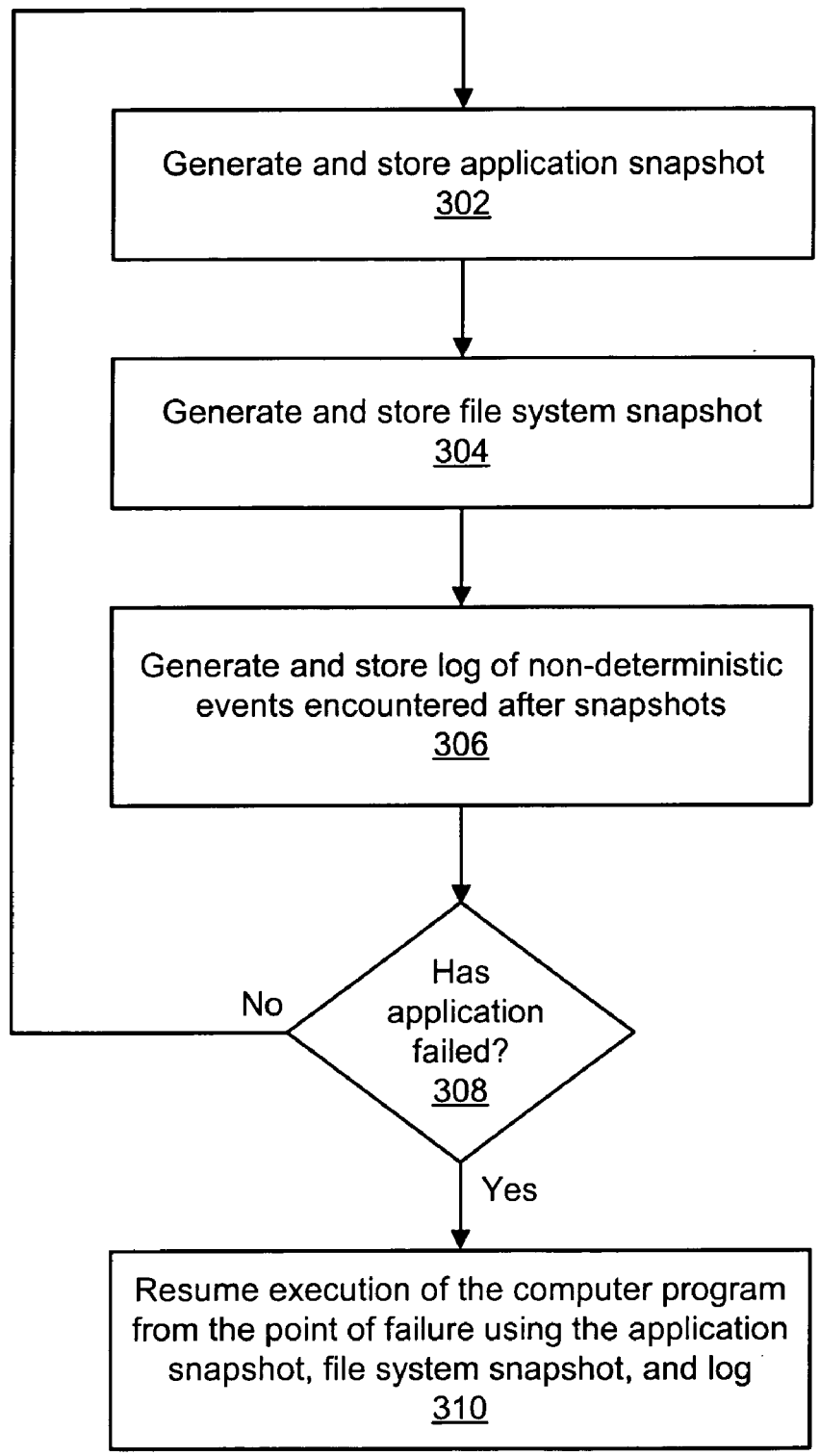
FIG. 3 is a flowchart illustrating a method for failover based on capturing and restoring a file system snapshot, application snapshot, and log of events according to one embodiment.

FIG. 3 is a flowchart illustrating a method for failover based on capturing and restoring a file system snapshot, application snapshot, and log of events according to one embodiment. In one embodiment, any of the steps 302 through 310 may be performed programmatically, i.e., by executing instructions on a computer system to implement the steps. In one embodiment, any of the steps 302 through 310 may be performed automatically, i.e., without user intervention.

In 302, an application snapshot may be generated and stored on a storage device as discussed above with respect to FIG. 2. In 304, a file system snapshot may be generated and stored on a storage device as discussed above with respect to FIG. 2. In 306, an event log may be generated and stored on a storage device as discussed above with respect to FIG. 2. The log may be continuously updated with new events between the generation of snapshots in 302 and 304. In one embodiment, an older application snapshot may be discarded after a new application snapshot is successfully generated and stored. Likewise, an older file system snapshot may be discarded after a new file system snapshot is successfully generated and stored. In one embodiment, an older log may be discarded after a new application snapshot and new file system snapshot are successfully generated and stored.

For purposes of illustration, steps 302 through 306 are depicted in a particular order. In other embodiments, steps 302, 304, and 306 may be performed in a different order than the order depicted in FIG. 3. For example, step 304 may be performed before step 302, or steps 302 and 304 may be performed substantially simultaneously. In one embodiment, steps 302 through 306 may be performed a plurality of times until a failure is detected in 308.

In 308, it may be determined that execution of the computer program 104 has failed on a server 102 at a particular point in time. Failure of the application instance 104 may be caused by a hardware or software fault in the server 102 itself or by a fault in an external entity such as a storage device. In one embodiment, the failure may be sensed automatically by another server 102 using conventional cluster management techniques. The failure may also be sensed by another element such as a client 110, a storage device 130, or another computer system tasked with oversight of the multi-server networked environment.

For purposes of illustration, the failure detection 308 is depicted in FIG. 3 as occurring after step 306. However, the failure detection 308 may occur at substantially any point between steps 302 through 310 in one embodiment. The failure detection 308 may also occur during any of steps 302, 304, or 306. In a common example, the failure may be detected while events are being logged in 306 in between the generation of the snapshots.

In 310, execution of the computer program may be resumed (e.g., on another server) from the particular point in time by restoring the application snapshot, file system snapshot, and log to another instance of the program. Execution of the application 104 may then continue from the point of failure.

The most recent valid application snapshot and the most recent valid file system snapshot may be restored. Restoring the application snapshot may comprise restoring the execution state, memory state, transaction state, open network connections, open files, and other suitable state-related data from the application snapshot to the context of another application instance (e.g., on another server). Restoring the file system snapshot may comprise restoring the contents and metadata of a file system used by the first application instance and captured in the file system snapshot to a storage device accessible to the new application instance. In various embodiments, the file system snapshot may be restored to a same storage device or a different storage device with respect to the location of the original file system. In one embodiment, restoring the file system snapshot may comprise restoring data and metadata to a storage stack comprising the second server, the target storage device, and/or a connectivity layers.

After restoring the snapshots, entries in the log may be replayed in the same order and with the same results as originally encountered to restore the application state 103 deterministically. Replaying the logged events to restore the application state 103 may comprise executing or simulating execution of the events in the same order and with the same results as originally detected and logged. After restoring the snapshots and the log, including the opening of connections to any clients 110, execution of the application 104 may continue in from a point in time at or immediately prior to the point of failure. In this manner, the failover 105 from one server to another server may be transparent to any clients 110. The clients 110B may be unaware of the failover from the first server to the second server, and the clients 110B may take no steps to resume the connections. In this manner, the failover 105 from one server to another server may be transparent to any clients 110.

In one embodiment, network connections between servers 102 and clients 110 may be virtualized through a network virtualization layer. The network virtualization layer may be present on any server 102 involved in the failover process. The network virtualization layer may provide servers with a virtual network address (e.g., a virtual IP address) which is mapped to an actual network address. Using the network virtualization layer, a network connection between a first server and a client may be transferred to and restored on a second server such that the client is unaware that a failover from the first server to the second server has taken place.

Figure 4:
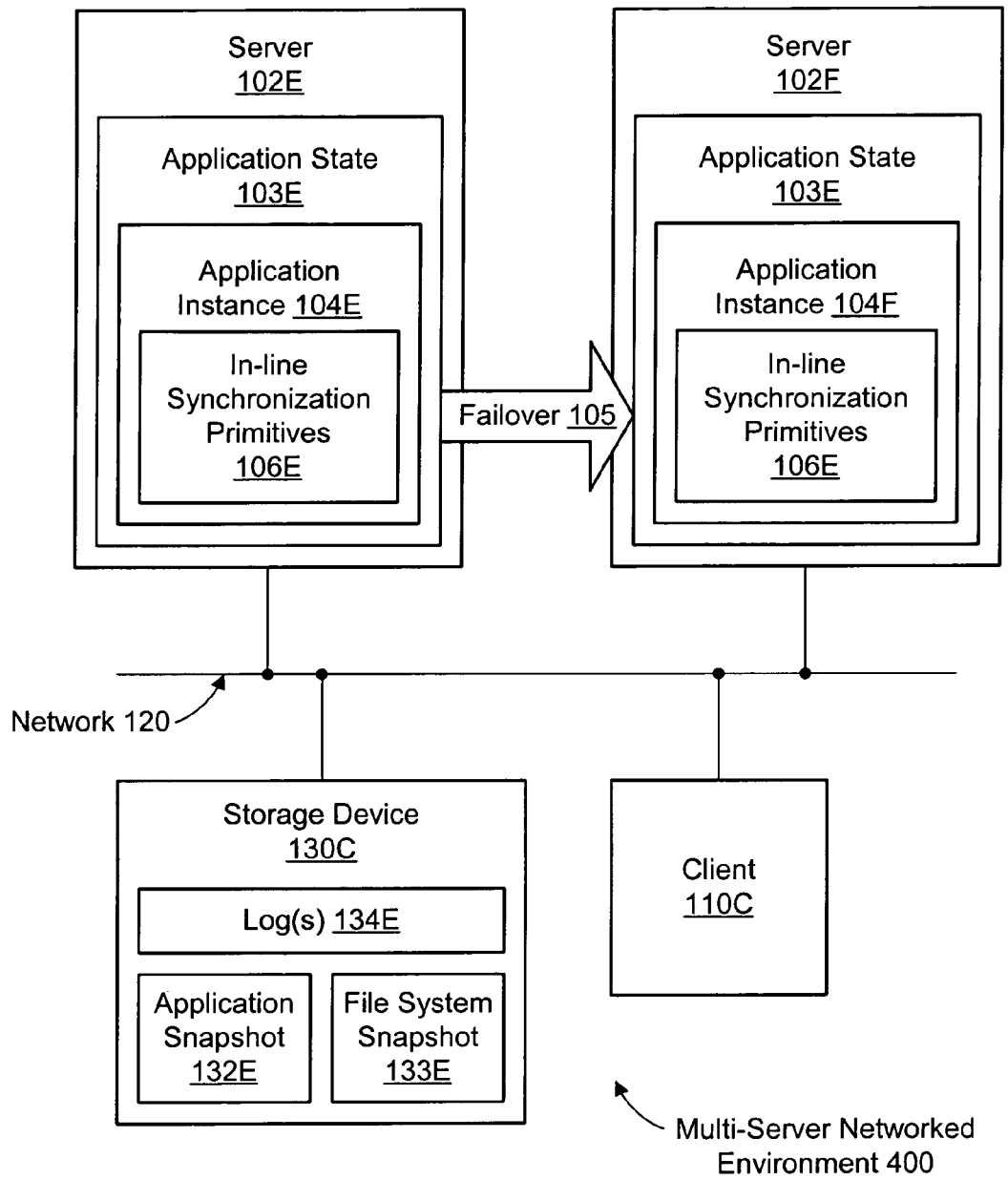
FIG. 4 illustrates a multi-server networked environment including detection, interception, and/or capture of in-line synchronization primitives according to one embodiment.

The application may include in-line synchronization primitives (also referred to herein as "latches") which are also preserved and duplicated along with the rest of the application state 103. FIG. 4 illustrates a multi-server networked environment 400 including detection, interception, and/or capture of in-line synchronization primitives 106E according to one embodiment. To enable deterministic replay of the application, synchronization instructions 106E should be logged in the same order in which they were used. If the application uses library calls or calls to the kernel for such instructions (e.g., for semaphores), then the synchronization instructions may be detected and logged using conventional techniques (e.g., for monitoring the kernel). However, the application may perform such instructions internally or in-line, such that the instructions are invisible to the operating system (i.e., outside of kernel knowledge). For example, applications running in user mode may avoid calling the kernel for such instructions. As illustrated in FIG. 4 and discussed in greater detail below, preservation of the application state 103 may include the detection, interception, and/or capture of in-line synchronization instructions 106E.

Figure 5:
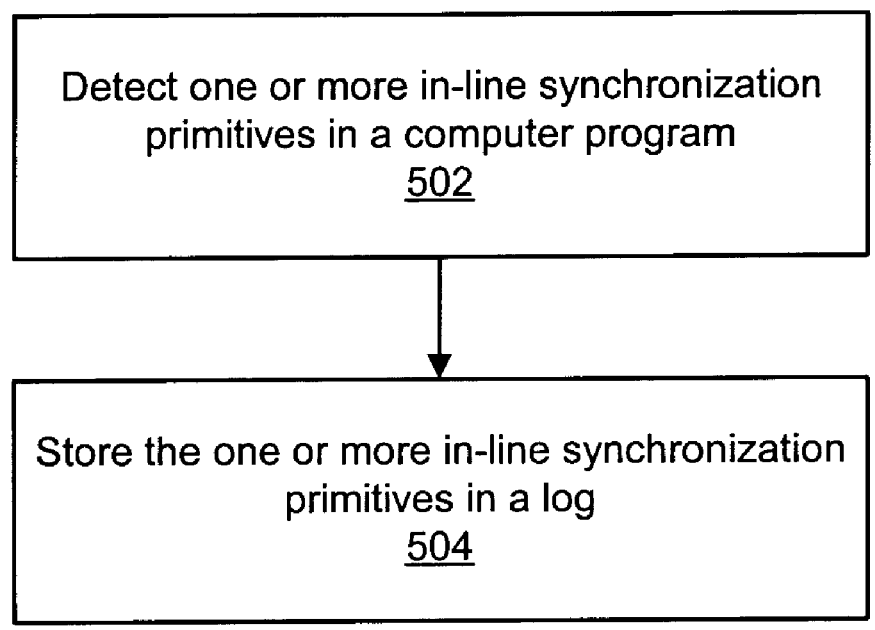
FIG. 5 is a flowchart illustrating a method for detecting and logging in-line synchronization primitives according to one embodiment.

FIG. 5 is a flowchart illustrating a method for detecting and logging in-line synchronization primitives according to one embodiment. In one embodiment, in-line synchronization instructions may comprise synchronization primitives which are executed atomically. Synchronization primitives may include atomic test-and-set instructions, atomic compare-and-swap instructions, atomic fetch-and-add instructions, and other suitable instructions for solving synchronization or concurrency problems. For example, synchronization primitives on a SPARC platform may include "ldstub," "ldstuba," "swap," "swapa," "casa," and "casxa" in one embodiment. Synchronization primitives may also be referred to herein as "latches." In 502, one or more in-line synchronization primitives 106 are detected in a computer program 104. As discussed in greater detail below, the in-line synchronization primitives 106 may be detected programmatically and automatically by use of computer-executable program instructions. In 504, the one or more in-line synchronization primitives 106 are stored in a log 134 in the same order and with the same results as originally encountered.

In one embodiment, dynamic binary compilation techniques may be used to detect, intercept, and/or capture the one or more in-line synchronization primitives in the computer program. Dynamic binary compilation is a technique used for generating program code at runtime. Dynamic binary compilation may also be referred to as "dynamic compilation."

Figure 6:
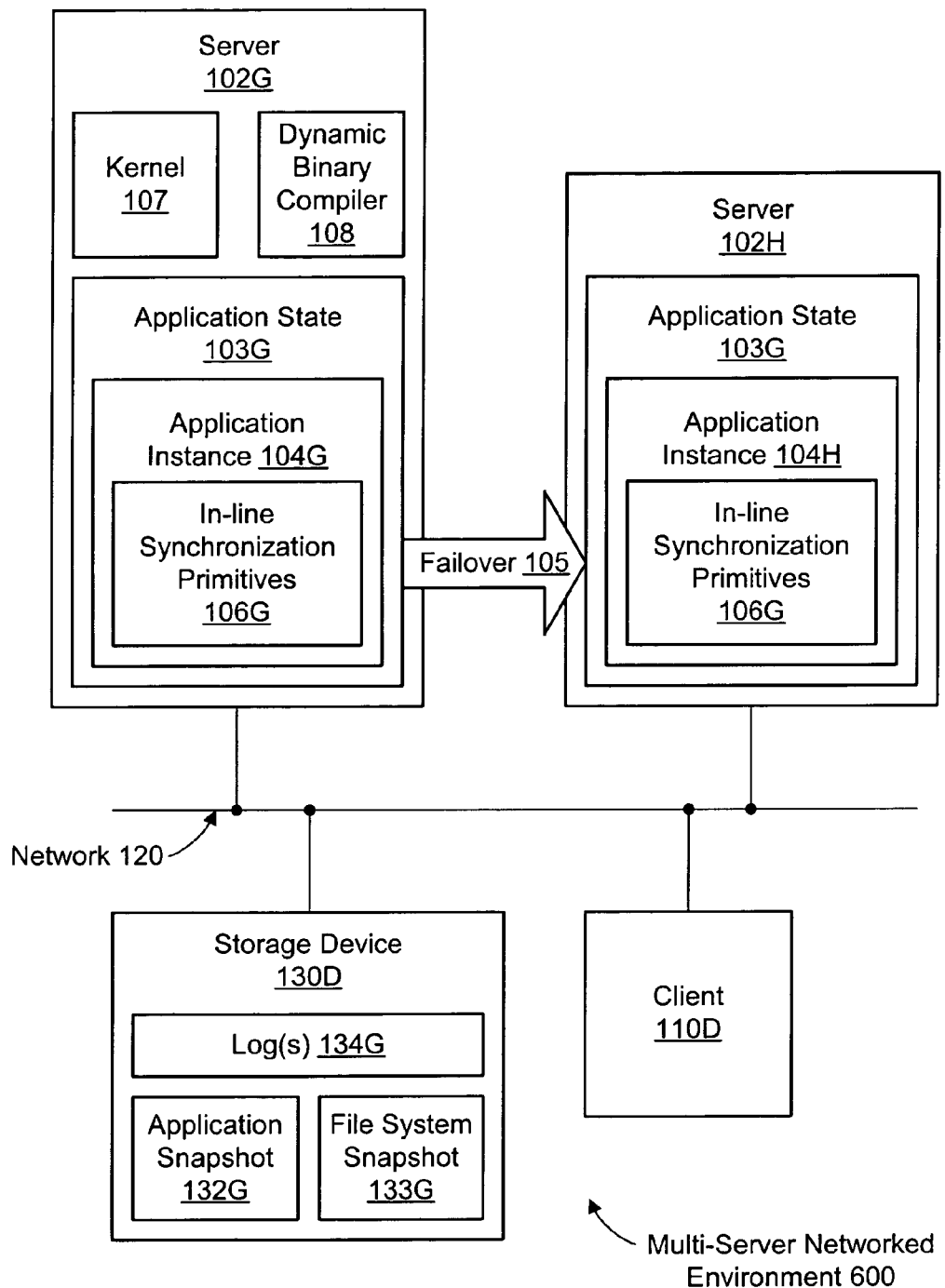
FIG. 6 illustrates a multi-server networked environment including detection, interception, and/or capture of in-line synchronization primitives using dynamic binary compilation according to one embodiment.

FIG. 6 illustrates a multi-server networked environment 600 including detection, interception, and/or capture of in-line synchronization primitives using dynamic binary compilation according to one embodiment. The dynamic binary compilation may be implemented by a dynamic binary compiler 108 which generates and/or modifies executable program code for an application instance 104G at runtime. The dynamic binary compiler 108 may provide a full view of program code segments in a currently running application instance. The dynamic binary compiler 108 may then permit instructions in the program code to be analyzed, modified, and/or replaced as they are initially encountered at runtime. In one embodiment, the dynamic binary compiler may run against binary program code. In another embodiment, the dynamic binary compiler may run against program source code in a high-level programming language such as C or C++. In one embodiment, the dynamic binary compiler 108 may be employed without any prior modification of the program code of the application 104. The dynamic binary compiler 108 may be implemented primarily in software.

Figure 7:
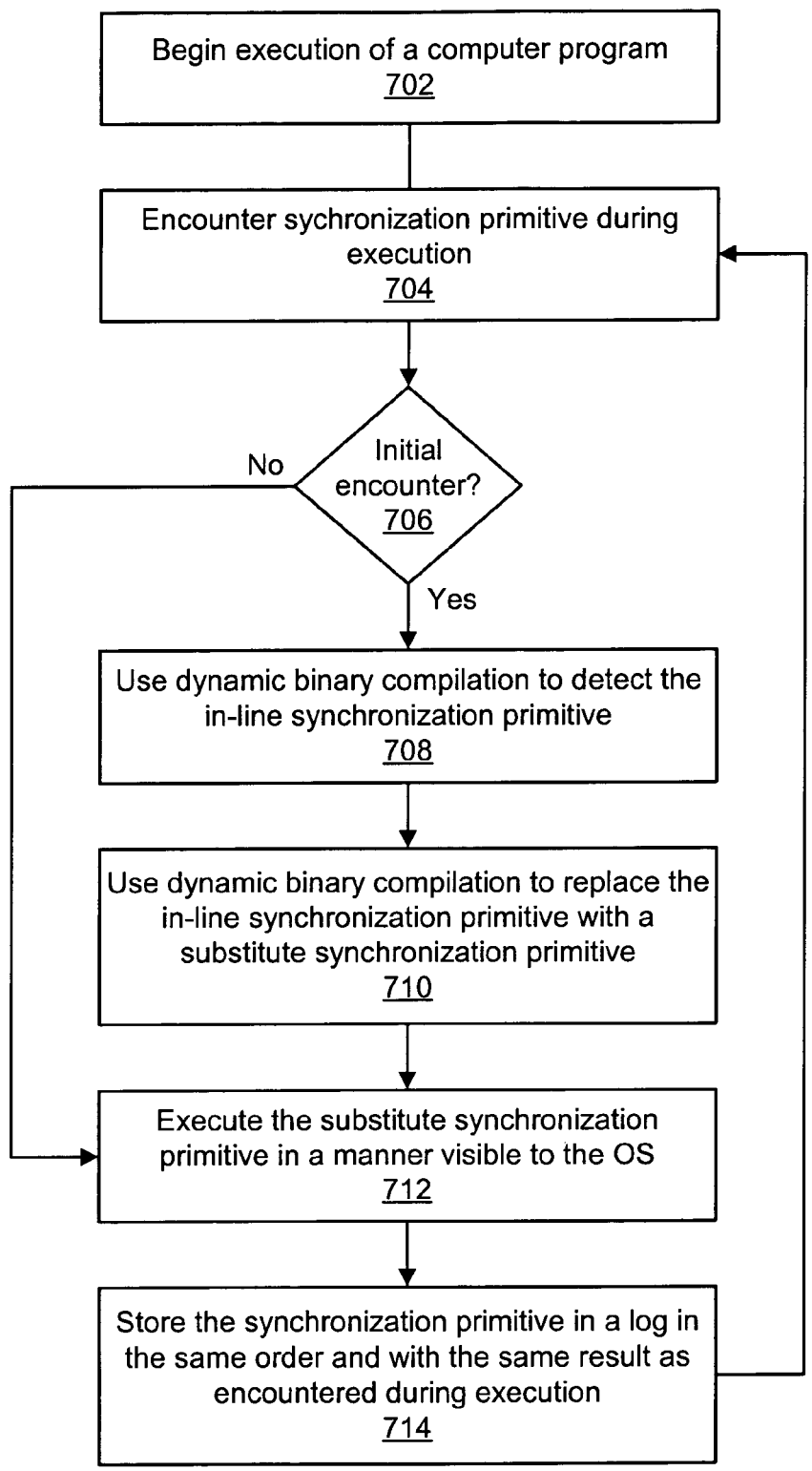
FIG. 7 is a flowchart illustrating a method for detecting and logging in-line synchronization primitives using dynamic binary compilation according to one to embodiment.

FIG. 7 is a flowchart illustrating a method for detecting and logging in-line synchronization primitives using dynamic binary compilation according to one embodiment. In 702, execution of a computer program may begin. At this point, the dynamic binary compiler 108 may begin examining the program code instruction-by-instruction during execution. In 704, a synchronization primitive is encountered. If the current encounter is the first encounter of the particular instruction during execution (as determined in 706), then the dynamic binary compiler 108 detects the presence of the in-line synchronization primitive in the computer program code in 708. The in-line synchronization primitive may be detected by analyzing an instruction or sequence of instructions encountered in the program code and recognizing that the instruction or sequence of instructions includes one of the in-line synchronization primitives 106. To enable the recognition, the dynamic binary compiler 108 may permit the differentiation of instructions (e.g., in-line synchronization primitives) from constants in the executing program code.

In 710, the dynamic binary compiler may modify the in-line synchronization primitive to permit its logging. The in-line synchronization primitive may be replaced by or redirected to a substitute synchronization primitive which is visible to the operating system (e.g., the kernel 107 or other core element of the operating system). In one embodiment, the dynamic binary compiler 108 may automatically substitute the in-line synchronization primitive with program code to switch the process into the kernel, where the substitute synchronization primitive may be executed. In one embodiment, the replacement code in the application program may comprise a trap, wherein control is transferred to the operating system (e.g., for execution of the substitute synchronization primitive) and then back to the application program. In 712, the substitute synchronization primitive is then executed in a manner which is visible to the operating system (OS), such as by executing the substitute synchronization primitive in kernel mode. Steps 710 and/or 712 may also be referred to as "intercepting" the in-line synchronization primitives. Steps 710 and/or 712 may also be referred to as "simulating" execution of the in-line synchronization primitives. The in-line synchronization primitives 106 shown in FIGS. 4 and 6 may include both the original in-line synchronization primitives (i.e., the instructions prior to being detected) and the substitute synchronization primitives (i.e., the instructions after being detected and modified).

In 714, the substitute synchronization primitive is recognized by the operating system and stored in a log 134. The synchronization primitive may be logged in the same order (with respect to other logged events) and with the same result as encountered during execution. In one embodiment, each synchronization primitive may be logged at substantially the same time at which it is encountered in the execution of the computer program. Each synchronization primitive may be logged each time it is encountered in the execution of the computer program. Storing or logging the synchronization primitive may also be referred to as "capturing" the synchronization primitive.

Execution of the computer program may continue after the logging in 714. Each in-line synchronization primitive encountered for the first time may be detected and intercepted using dynamic binary compilation as shown in steps 708 through 712. However, a subsequent encounter with the synchronization primitive may bypass steps 708 and 710 and quickly result in the execution and logging of the substitute synchronization primitive in 712 and 714.

In one embodiment, any performance penalty suffered due to dynamic binary compilation may be small. After each synchronization primitive is initially encountered in the program code, recognized, and replaced, the application instance 104 will typically run at substantially the same speed as an unmodified version of the same application.

Figure 8:
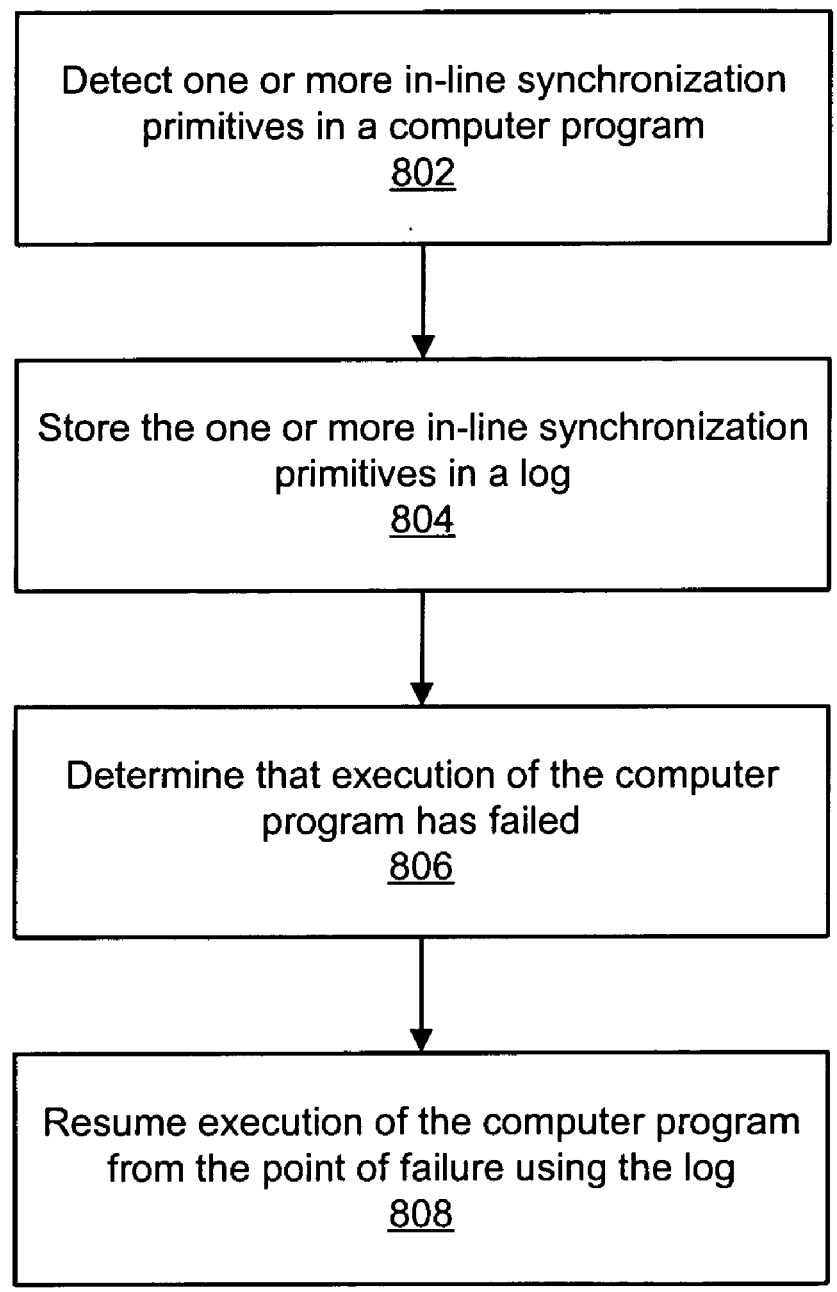
FIG. 8 is a flowchart illustrating a method for application failover based on the detection and logging of in-line synchronization primitives according to one embodiment.

In one embodiment, execution of the computer program may be deterministically replayed using the log 134. FIG. 8 is a flowchart illustrating a method for application failover based on the detection and logging of in-line synchronization primitives according to one embodiment. In 802, one or more in-line synchronization primitives 106 are detected in a computer program 104. The in-line synchronization primitives 106 may be detected programmatically and automatically by use of computer-executable program instructions, such as a dynamic binary compiler 108. In 804, the one or more in-line synchronization primitives 106E are stored in a log 134 as discussed above.

In 806, it is determined that execution of the computer program 104 has failed on a server 102 at a particular point in time. Failure of the application instance 104 may be caused by a hardware or software fault in the server 102 itself or by a fault in an external entity such as a storage device. In one embodiment, the failure may be sensed automatically by another server 102 (e.g., using conventional cluster management techniques). The failure may also be sensed by another element such as a client 110, a storage device 130, or another computer system tasked with oversight of the multi-server networked environment.

In 808, the log 134 is used to resume execution of the computer program on another sever 102 from the particular point in time. In one embodiment, the most recent valid application snapshot 132 and/or file system snapshot 133 may initially be restored. After restoring the snapshots 132 and/or 133, entries in the log 134 may be replayed in the same order and with the same results as originally encountered to restore the application state 103 deterministically. The log 134 may comprise any events that are capable of introducing non-determinism into program execution along with the results of such events. For example, the log 134 may comprise a record of events and results such as transaction requests from clients 110 of the application, interprocess communication events, TCP/IP events, other file I/O, system calls for random number generation, system calls for a date or time, attempts to acquire semaphores, signal execution, etc. As discussed above, the log may comprise synchronization primitives 106 that were detected and logged in the proper order using dynamic binary compilation techniques. Replaying the synchronization primitives to restore the application state 103 may comprise executing or simulating execution of the primitives in the same order and with the same results as originally detected and logged. After restoring the snapshots 132 and/or 133 and the log 134, including the opening of connections to any clients 110, execution of the application 104 may continue from a point in time at or immediately prior to the point of failure. In this manner, the failover 105 from one server 102 to another server 102 may be transparent to any clients 110.

In one embodiment, the application state 103 restored to the second server 102 may include the substitute synchronization primitives generated according to FIG. 7. The application snapshot 132 of the first application instance 104 may preserve the virtual memory relevant to the first instance 104, including the substitute synchronization primitives. When the application snapshot is used to restore the virtual memory for the second instance 104, the substitute synchronization primitives may be automatically restored without a need to detect and modify the original, in-line synchronization primitives a second time. In one embodiment, if all the in-line synchronization primitives 106 in the application 104 were not encountered prior to failure, the application state 103 restored to the second server 102 may include a combination of the substitute synchronization primitives that were previously inserted and the original, in-line synchronization primitives that were not yet encountered.

Figure 9:
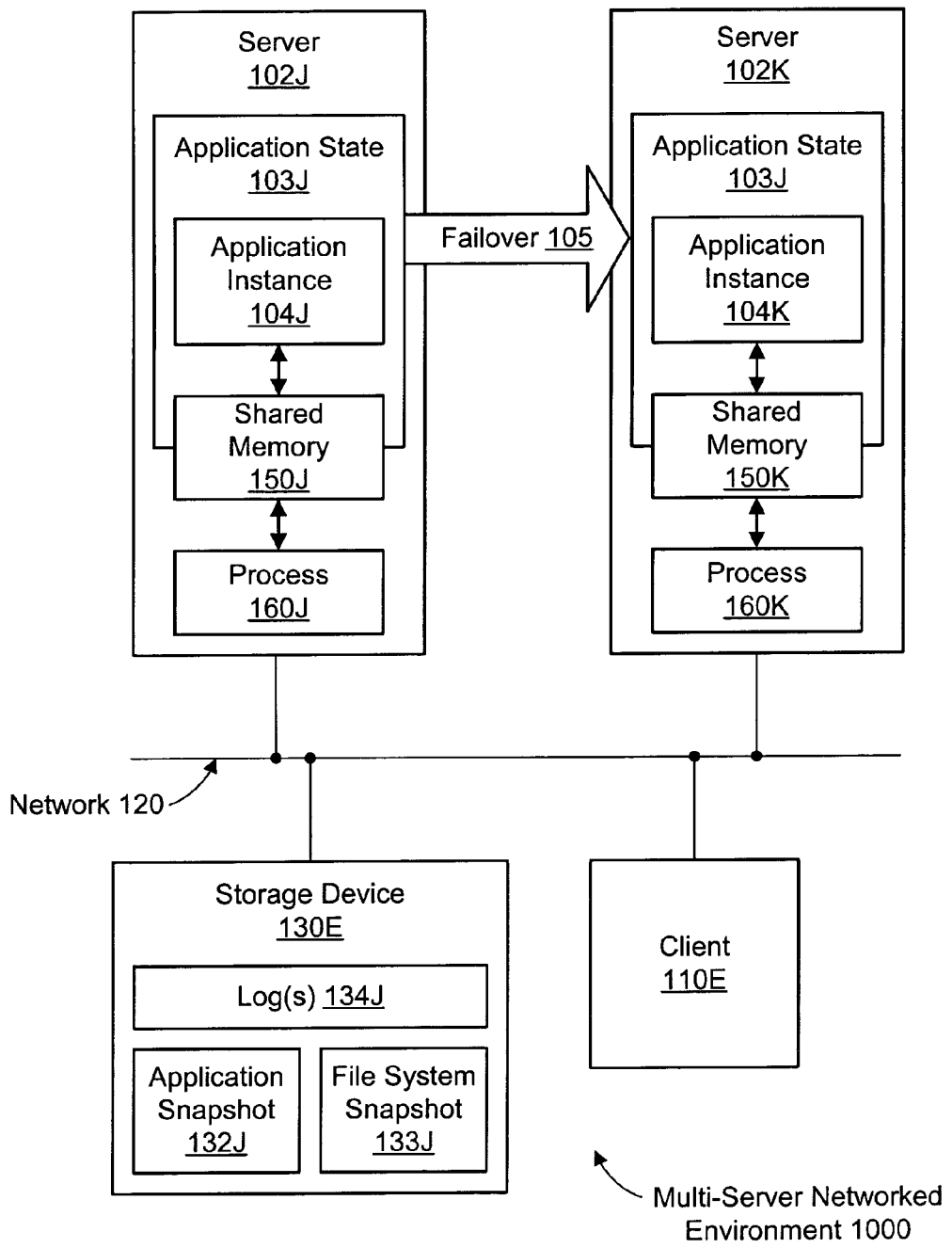
FIG. 9 illustrates a multi-server networked environment including logging and replay of shared memory accesses according to one embodiment.

In one embodiment, the logging and replay discussed with reference to FIGS. 2 and 3 may include the logging and replay of accesses to shared memory by arbitrary applications 104. FIG. 9 illustrates a multi-server networked environment 1000 including logging and replay of shared memory accesses according to one embodiment. By logging accesses of an application instance 104J to a shared memory 150J (i.e., a memory shared with one or more other processes 160J), execution of the application may be deterministically replayed using another application instance 104K which accesses a shared memory 150K (i.e., a memory shared with one or more other processes 160K). In one embodiment, all or part of the shared memory 150J may be considered part of the application state 103J which is preserved and duplicated from one server 102J to another server 102K. In one embodiment, all the processes 104J and 160J which access the shared memory 150J may be migrated from one server 102J to another server 102K via the failover mechanism 105 described herein.

Each of the servers 102 may include a paging mechanism for memory management. The paging mechanism may be implemented by a memory management unit (MMU) which divides available memory into a plurality of units called pages. The shared memory 150J may therefore include a plurality of pages. When paging is used in conjunction with virtual memory techniques, pages not in use may be swapped out to a slower memory medium (e.g., a hard drive) from a more accessible memory medium (e.g., RAM). If a consumer (i.e., an application, process, or thread) requests a page that is swapped out to disk, the paging mechanism may bring the requested page back into memory for faster access.

Figure 10:
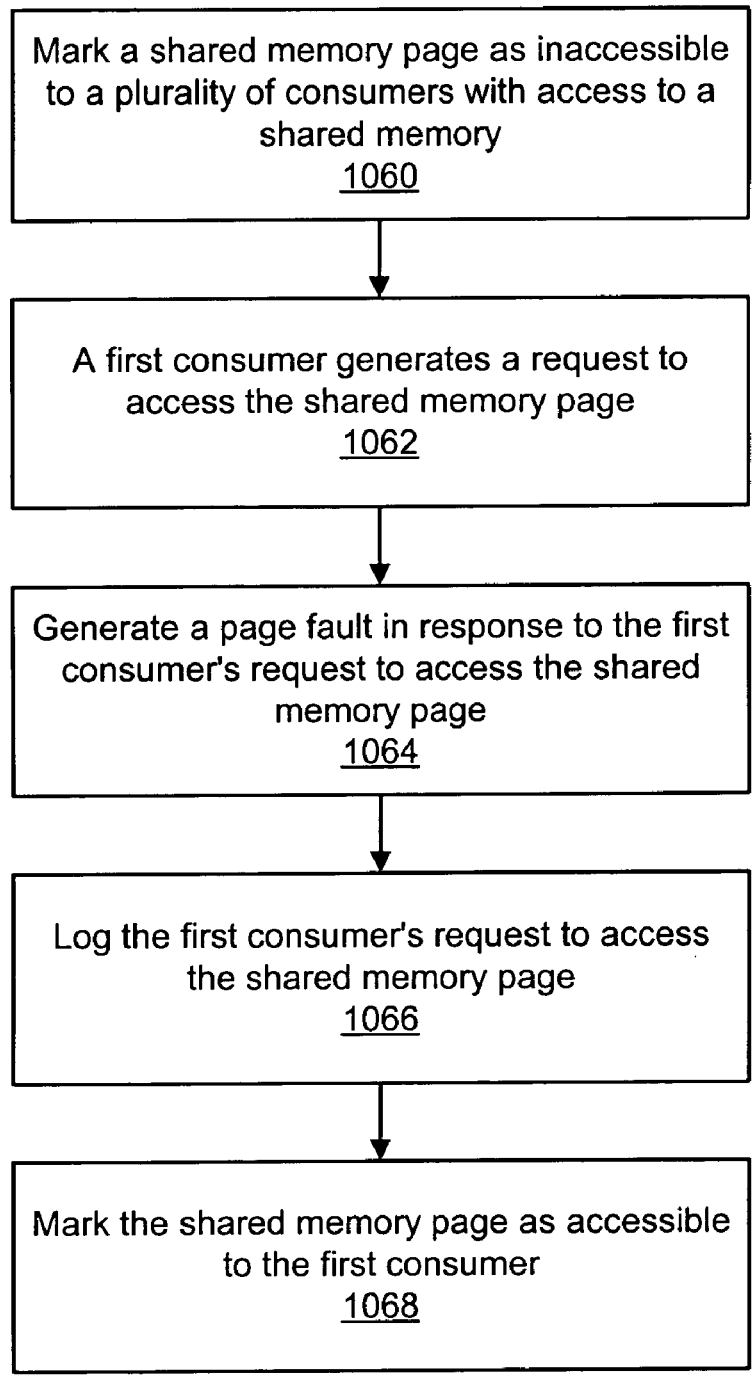
FIG. 10 is a flowchart illustrating a method for identifying accesses to shared memory according to one embodiment.

FIG. 10 is a flowchart illustrating a method for identifying accesses to shared memory 150J according to one embodiment. In 1060, the pages in the shared memory 150J may be marked as inaccessible (e.g., as swapped out) to a plurality of memory consumers with access to the shared memory. The exact flags and page modes of the paging mechanism used to indicate inaccessibility may vary depending upon the processor or other hardware of the server 102. The memory consumers may include any applications, processes, or threads with access to the shared memory.

In 1062, a first consumer (e.g., the application instance 104J) may generate a first request to access the shared memory page. In 1064, a page fault may be generated in response to the first consumer generating the first request to access the shared memory page. The page fault may be generated automatically and programmatically, e.g., by the MMU on the server 102, due to the request for a swapped-out page. As a result of the page fault, a page fault handler may be invoked.

In 1066, the first consumer's request to access the shared memory page is logged. In one embodiment, the page fault handler may perform the logging. Logging the access request may comprise generating one or more log entries including the application state of the requesting consumer as discussed with reference to FIG. 2. The consumer may be stopped while the application state is captured. In 1068, the shared memory page is marked as accessible (e.g., not swapped out) to the first consumer. The page fault handler may also perform step 1068. The first consumer may then access the page (e.g., for reading or writing data) as requested. By marking the page in this manner, the first consumer may effectively be granted ownership over the page. Therefore, if the first consumer generates another request to access the shared memory page, the first consumer may access the page without generating another page fault.

Figure 11:
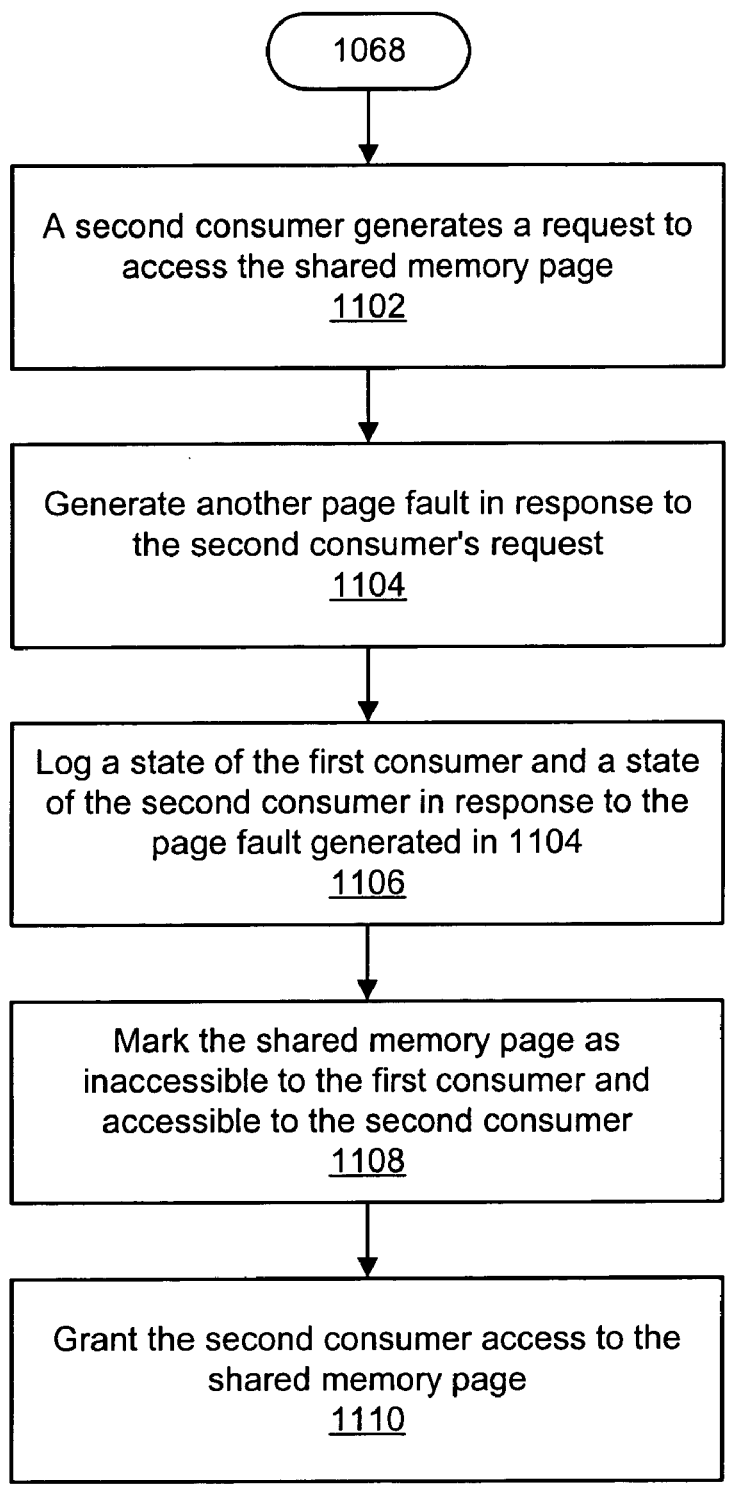
FIG. 11 is a flowchart further illustrating a method for identifying accesses to shared memory according to one embodiment.

FIG. 11 is a flowchart further illustrating a method for identifying accesses to shared memory according to one embodiment. In 1102, a second consumer may generate a second request to access the shared memory page after the first consumer has acquired "ownership" over the page. As in step 1064, another page fault may be generated in 1104 in response to the second consumer's request. In 1106, in response to the page fault generated in 1104, log entries may be generated. In one embodiment, a log entry capturing the application state of the first consumer and a log entry capturing the application state of the second consumer may be stored. In 1108, the shared memory page may be marked as inaccessible (e.g., swapped out) to the first consumer and marked as accessible to the second consumer. Therefore, the second consumer may assume "ownership" over the page. Both consumers may be stopped while their application states are captured and resumed after ownership of the page is transferred. In 1110, the second consumer may access (e.g., for reading or writing data) the shared memory page per the request.

As discussed with reference to FIGS. 2 and 3, execution of the application instance 104J may be replayed deterministically using the log entries generated upon handling of the page faults. A mechanism similar to that discussed with reference to FIGS. 10 and 11 may be used for the replay of the accesses to the shared memory. Accesses to shared memory are played back in the same order as originally logged. In one embodiment, the replayed application instance 104K may be instrumented to ensure deterministic playback. For example, the application instance 104K may be instrumented so that synchronization points which are not directly related to access of shared memory are respected. A log entry generated for the application instance 104K upon transfer of ownership from the application instance 104K to another process 160K may not refer to a well-defined execution state of the application instance 104K. Therefore, a breakpoint may be set in the application instance 104K, and application state data in the log entry such as a program counter and/or stack contents may be compared with current state data to determine when ownership of the page was transferred to the other process 160K.

By controlling both read and write accesses to shared memory, the systems and methods discussed above with reference to FIGS. 9-11 may ensure deterministic playback in the presence of data races among memory consumers. However, if it is known that there are no data races in an application or set of applications, then the shared memory access identification may be refined as follows. As discussed above, synchronization points (e.g., semaphores) may be logged by monitoring system calls and/or identifying in-line synchronization instructions. Access to shared memory may be identified and logged by detecting write operations to shared memory pages. Therefore, to identify synchronization operations in shared memory, write requests to shared memory may be logged while read requests are ignored. Shared memory pages may be marked as inaccessible for writes (e.g., "trap on write access"). Ownership of a shared memory page may be transferred on a write request from a new consumer but not on a read request.

In one embodiment, the shared memory access identification may be further refined by detecting failed synchronization instructions. For example, if an attempt to obtain a mutex fails, ownership of a page may not be altered. Therefore, the original owner may retain ownership, and the effect of the failed instruction may be simulated on replay.

The systems and methods discussed above with reference to FIGS. 9-11 may be used to implement distributed shared memory applications in one embodiment. In the distributed shared memory system, ownership of shared memory pages may be assigned and transferred as discussed above. An access to a page from a distributed application may cause a change in the ownership of the page. Changes in page contents may be exchanged between the involved components by network connections or other suitable interconnection techniques and systems.

Figure 12:
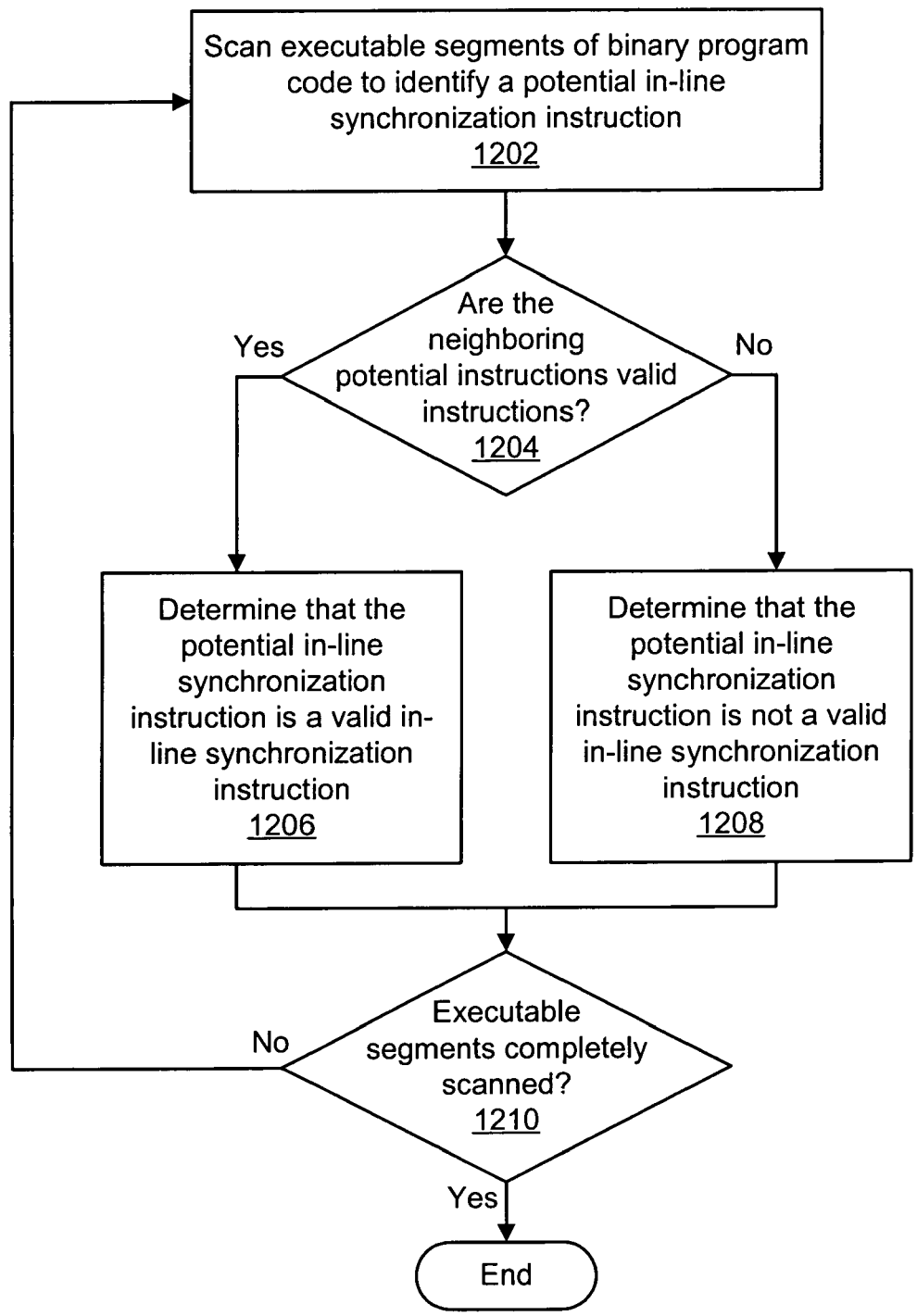
FIG. 12 is a flowchart illustrating a method for identifying in-line synchronization instructions in binary program code by analysis of neighboring data.

As discussed with reference to FIGS. 4 and 5, the application 104 may include in-line synchronization instructions 106 which are preserved and duplicated along with the rest of the application state 103. FIG. 12 is a flowchart illustrating a method for identifying in-line synchronization instructions 106 in binary program code 104 by analysis of neighboring data. Beginning in 1202, one or more executable segments of the binary program code may be scanned to identify one or more potential in-line synchronization instructions. Scanned executable segments may comprise, for example, executable segments after a fork( ) executable segments mapped into memory using the mmap system call, and/or memory pages with page permissions set to "executable."

In one embodiment, the target processor for the binary program code may be configured to execute fixed-length instruction words. In this case, a potential in-line synchronization instruction may be identified by matching it against a set of known synchronization instructions for the target platform. However, a potential in-line synchronization instruction found in the binary program code may actually comprise non-executable data instead of a valid, executable instruction, so the goal of the method for identifying in-line synchronization instructions is to determine whether each potential in-line synchronization instruction is actually a valid in-line synchronization instruction.

In one embodiment, the target processor for the binary program code may be configured to execute variable-length instruction words. In this case, a potential in-line synchronization instruction may be identified by creating and analyzing a graph of possibilities for each candidate phrase found in the binary program code. A candidate phrase may comprise any sequence of data which is analyzed to determine whether it is a potential in-line synchronization instruction. A candidate phrase may comprise, for example, a sequence which resembles a potential in-line synchronization instruction or synchronization prefix. The candidate phrases may vary in length. The graph of possibilities created for each candidate phrase may comprise a set of potential in-line synchronization instructions (e.g., beginning with or including the candidate phrase). A potential in-line synchronization instruction may be identified if it is determined that the potential in-line synchronization instruction is within the graph of possible instructions for the corresponding candidate phrase.

After identifying a potential in-line synchronization instruction in 1202, neighboring potential instructions may be identified and analyzed in 1204 to determine their validity or invalidity. The neighboring potential instructions may comprise information in the binary program code which is located in the vicinity of the potential in-line synchronization instruction. As with the potential in-line synchronization instruction, the neighboring potential instructions may actually comprise non-executable data rather than valid, executable instructions. The in-line synchronization instruction identification method may use the validity or invalidity of the neighboring potential instructions to signify the validity or invalidity of the potential in-line synchronization instruction. The validity of a neighboring potential instruction may be determined by comparing it to the instruction set for the target platform (e.g., the target processor).

In one embodiment, data following the potential in-line synchronization instruction may be analyzed as potential neighboring instructions up to a pre-defined threshold. In one embodiment, a local sequence of potential neighboring instructions may be identified and analyzed. In one embodiment, branches may be followed recursively up to a pre-defined level to identify additional neighboring potential instructions. Analysis may be terminated if absolute branches are reached which cannot be decoded statically (e.g., if the branch target is in a register). In one embodiment, the neighboring potential instructions analyzed in 1202 may primarily be subsequent to the potential in-line synchronization instruction. However, information preceding the potential in-line synchronization instruction may also be analyzed. For example, if the instruction set supports branch-delay instructions, then the neighboring potential instruction preceding the potential in-line synchronization instruction may also be analyzed.

If it is determined that the neighboring potential instructions are valid instructions, then a determination that the corresponding potential in-line synchronization instruction is a valid in-line synchronization instruction may be made in 1206. However, if it is determined that the neighboring potential instructions are not valid instructions, then a determination that the corresponding potential in-line synchronization instruction is not a valid in-line synchronization instruction may be made in 1208. In one embodiment, a single invalid "instruction" (i.e., an element of non-executable data) found in the set of potential neighboring instructions may result in a determination of invalidity in 1208. Until it is determined in 1210 that the executable segments have been completely scanned, the scanning and analysis may continue for additional potential in-line synchronization instructions.

In one embodiment, the technique discussed with respect to FIG. 12 may identify all valid in-line synchronization instructions while not returning any false positives. In other embodiments, the in-line synchronization instruction identification may be augmented with additional analysis. In one embodiment, for example, a breakpoint may be set in the binary program code at the instruction address for each in-line synchronization instruction identified in 1206. When the breakpoint is encountered in execution of the binary program code, the instruction data address may be calculated and evaluated. The instruction corresponding to the breakpoint may be considered to be a synchronization instruction if the data address is in a shared memory segment. Therefore, it may be determined that the instruction is not a valid in-line synchronization instruction if the instruction data address is not in a shared memory segment.

In one embodiment, the in-line synchronization instruction identification may be modified as follows for a target processor with separate read and exec page protection. A breakpoint may be set in the binary program code for each of the potential in-line synchronization instructions. Page protection for affected memory pages may be set to exec only. If a page access error occurs, the associated memory address may be determined. If the read was on an address with one of the breakpoints, then the address was a data address. The original memory context may be restored, and the access may be marked as safe (i.e., unrelated to an in-line synchronization instruction). However, if one of the breakpoints is executed, then it may be determined that the potential in-line synchronization instruction corresponding to the executed breakpoint is a valid in-line synchronization instruction. In either case, if it was the last potential in-line synchronization instruction on the page, then the original page permissions may be restored.

In one embodiment, the in-line synchronization instruction identification may be modified as follows for a target processor with combined read and exec page protection. The page permissions for one or more memory pages may initially be set to an invalid (e.g., swapped out) state. If a page fault occurs, the access type may be determined. Code accesses, data accesses, and associated memory locations may be recorded. If the access is a code access, the code in the page may be analyzed from the entry point as discussed with reference to FIG. 12. A breakpoint may be set in each potential exit address (i.e., each exit point where the execution path leaves the current page, or each location where a branch target is unknown). Once an exit point is hit, breakpoints may be removed and the current instruction may be stepped over. If the next instruction is in the same page and not analyzed, then the code may be analyzed as discussed with reference to FIG. 12. If the next instruction has already been analyzed, then continue setting breakpoints in each potential exit address.

In one embodiment, the in-line synchronization primitives 106 may be associated with spinlocks. A spinlock is a lock in which a process or thread requesting access to a shared resource may wait in a loop (i.e., it may "spin") while repeatedly checking the availability of the lock. A spinlock count or spinlock retry count is the number of attempts to acquire the lock (i.e., access to a resource) before the requesting application goes to sleep. The spinlock count may depend on the application configuration and design, the behavior of the operating system, and the execution sequence of other threads competing for the same latch. Therefore, the spinlock count for an arbitrary application is difficult to predict. If the spinlock count in the replay of an application differs from the spinlock count in the original execution, deterministic playback cannot be guaranteed.

Figure 13:
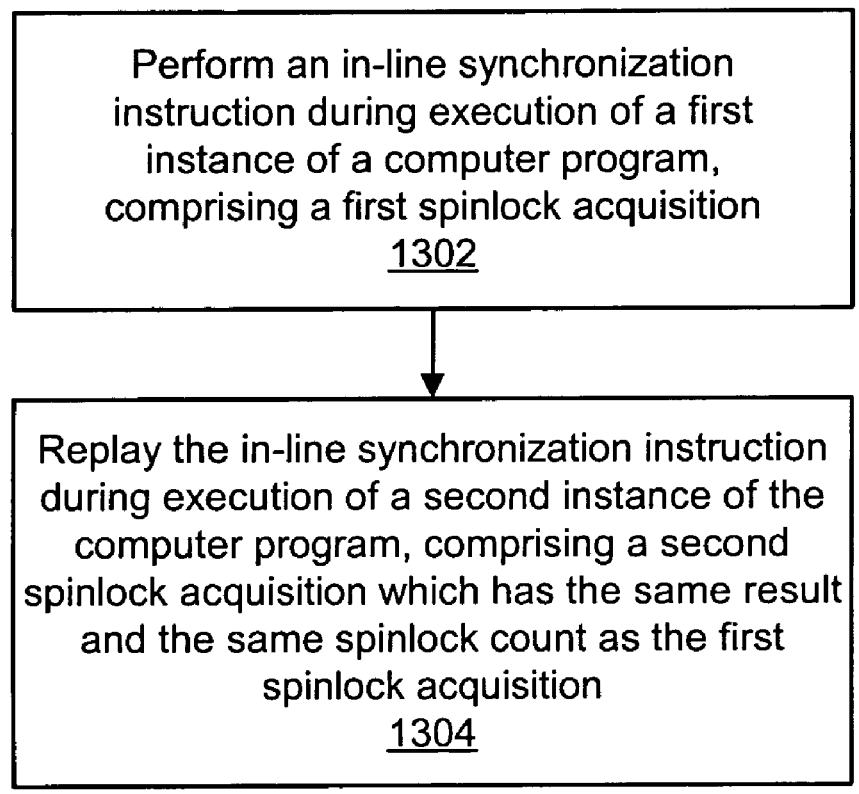
FIG. 13 is a flowchart illustrating a method for deterministic execution and playback of binary applications in the presence of in-line synchronization primitives and spinlocks according to one embodiment.

FIG. 13 is a flowchart illustrating a method for deterministic execution and playback of binary applications in the presence of in-line synchronization primitives and spinlocks according to one embodiment. In 1302, an in-line synchronization instruction may be performed during execution of a first instance of a computer program. Performing the in-line synchronization instruction may comprise a first spinlock acquisition. In one embodiment, performing the in-line synchronization instruction during execution of the first instance comprises emulating the in-line synchronization instruction in an operating system. The in-line synchronization instruction may be emulated in the operating system (e.g., in the kernel, a kernel-loadable module, or any other component operating in kernel mode) to ensure that the result is successful and to ensure that the first instance does not enter spinlock operation. When control returns to the application in user mode, the latch has been acquired.

In 1304, the in-line synchronization instruction may be replayed during execution of a second instance of the computer program. Replaying the in-line synchronization instruction may comprise a second spinlock acquisition. In one embodiment, replaying the in-line synchronization instruction during execution of the second instance again comprises emulating the in-line synchronization instruction in the operating system. As in 1302, the in-line synchronization instruction may be emulated in the operating system to ensure that the result is successful and to ensure that the second instance does not enter spinlock operation. Therefore, the second spinlock acquisition comprises the same result and the same spinlock count as the first spinlock acquisition. Consequently, deterministic replay of the original execution may be performed.

In one embodiment, both the first instance and second instance may be instrumented to facilitate the emulation of the in-line synchronization instructions. For example, a breakpoint may be inserted at the in-line synchronization instruction, and the emulation may then be performed in kernel mode. As used herein, the terms "instrumenting" and "instrumentation" refer to techniques of modifying a computer program (e.g., by installing additional logic) to monitor or alter execution of the program. The instrumentation may occur dynamically (i.e., during execution of the computer program), programmatically (i.e., by executing instructions on a computer system), and automatically (i.e., without user intervention). The instrumentation may also occur transparently (i.e., in a manner invisible to the application developer and user).

As discussed with reference to FIGS. 4-5, in-line synchronization instructions typically comprise uninterruptible atomic instructions or primitives. In one embodiment, the in-line synchronization instructions may comprise load-and-store instructions, swap instructions, and compare-and-set instructions. Emulation of each of these instruction types may be performed in the operating system as follows.

A load-and-store instruction (e.g., the "ldstub" instruction in a SPARC instruction set) reads a value from memory into a register and replaces it with a constant. A load-and-store instruction is unsuccessful if the value returned is identical to the value written. For example, the "ldstub" instruction fails to acquire a lock if the returned value is "0xff." Such an instruction may be emulated in the kernel by reading the memory address from the user context, executing the instruction in the kernel with the appropriate parameters, possibly entering a loop to retry the instruction until the lock is acquired (i.e., while the instruction is returning the unsuccessful value), and finally writing the successful result into the user context. Spinlock and wait may be implemented in the loop with an appropriate spinlock count.

A swap instruction (e.g., the "swap" instruction in a SPARC instruction set or the "xchg" instruction in an Intel instruction set) exchanges the value in a register with a value in memory. A swap instruction is unsuccessful if the value written to memory is identical to the value returned from memory. Such an instruction may be emulated in the kernel in a manner similar to a load-and-store instruction.

A compare-and-set instruction (e.g., the "cas" instruction in a SPARC instruction set) compares the value in a register with a value in memory. If the compared values are equal, the instruction replaces the value in memory with the value in another register. A compare-and-set instruction is unsuccessful if the value returned does not match the "compare" value. Such failures are rare, and the emulation may return failure in both the original execution and playback rather than attempt to guarantee success in one embodiment. In another embodiment, a more sophisticated code analysis may be performed to emulate the compare-and-set instruction. First, the code context surrounding the instruction may be examined. Second, the instruction which reads the original value from memory may be identified. Typically, this would be a memory read instruction reading from the same data address as the compare-and-set instruction. If there is a conditional branch following the compare-and-set instruction, it may be determined whether the branch results in a loop. If so, the analysis includes the complete loop. Next, the following code sequence may be identified and replaced with the emulation code, where the <modify> instruction is any arithmetic instruction and <xxx> is any register or constant:

<load [mem]→r1>
    <modify (r1,xxx)→r2>
    <cas [mem], r1, r2>

Exemplary Computer System

FIG. 14 illustrates a block diagram of a typical computer system 900 for implementing embodiments of the systems and methods described above. Computer system 900 may be illustrative of a server 102, client 110, or storage device 130. As used herein, "computing device" is synonymous with "computer system." Computer system 900 includes a processor 910 and a memory 920 coupled by a communications bus. Processor 910 can be a single processor or a number of individual processors working together. Memory 920 is typically random access memory (RAM), or some other dynamic storage device, and is capable of storing instructions to be executed by the processor, e.g., continuous availability software 940. Memory 920 is also used for storing temporary variables or other intermediate information during the execution of instructions by the processor 910.

Computer system 900 may also include devices such as keyboard & mouse 950, SCSI interface 952, network interface 954, graphics & display 956, hard disk 958, and other nonvolatile storage 960, all of which are coupled to processor 910 by a communications bus. In various embodiments, nonvolatile storage 960 may include optical media devices such as read-only or writable CD or DVD, solid-state devices such as nonvolatile RAM, or any other suitable type of nonvolatile storage. It will be apparent to those having ordinary skill in the art that computer system 900 can also include numerous elements not shown in the figure, such as additional storage devices, communications devices, input devices, and output devices, as illustrated by the ellipsis shown. An example of such an additional computer system device is a Fibre Channel interface.

Those having ordinary skill in the art will readily recognize that the techniques and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 940 may comprise program instructions executable, for example by one or more processors 910, to perform any of the functions or methods described above. Also, in some embodiments software 940 can be provided to the computer system via a variety of computer-accessible media including electronic media (e.g., flash memory), magnetic storage media (e.g., hard disk 958, a floppy disk, etc.), optical storage media (e.g., CD-ROM 960), and communications media conveying signals encoding the instructions (e.g., via a network coupled to network interface 954). In some embodiments, separate instances of these programs can be executed on separate computer systems in keeping with the methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computer systems with variations in, for example, the number of nodes, the type of operation of the computer system, e.g., cluster operation (failover, parallel, etc.), the number and type of shared data resources, and the number of paths between nodes and shared data resources.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A computer-implemented method for identifying in-line synchronization instructions in binary program code, the method comprising:
    performing by a computer:
        scanning one or more executable segments of the binary program code to identify one or more potential in-line synchronization instructions; and
        determining whether each of the one or more potential in-line synchronization instructions is non-executable data or a valid in-line synchronization instruction, comprising, for each potential in-line synchronization instruction:
            determining whether each respective one of a plurality of neighboring potential instructions is a valid instruction or non-executable data, wherein the plurality of neighboring potential instructions are located in a segment of the binary program code including the respective potential in-line synchronization instruction;
            determining that the respective potential in-line synchronization instruction is a valid in-line synchronization instruction in response to determining that all of the plurality of neighboring potential instructions in the segment are valid instructions; and
            determining that the respective potential in-line synchronization instruction is non-executable data in response to determining that one or more of the neighboring potential instructions in the segment are valid instructions and one or more of the neighboring potential instructions occurring prior to the one or more valid instructions in the segment are non-executable data.

2. The method of claim 1,
    wherein a target processor for execution of the binary program code is configured to execute variable-length instruction words;
    wherein identifying the one or more potential in-line synchronization instructions comprises determining that each of the one or more potential in-line synchronization instructions is within a graph of possible instructions for a corresponding candidate phrase in the binary program code.

3. The method of claim 1, further comprising:
    performing by a computer:
        for each valid in-line synchronization instruction:
            setting a breakpoint in the binary program code;
            evaluating an instruction data address when the breakpoint is encountered in execution of the binary program code; and
            determining that the in-line synchronization instruction corresponding to the breakpoint is not a valid in-line synchronization instruction if the instruction data address is not in a shared memory segment.

4. The method of claim 1, further comprising:
    performing by a computer:
        setting a breakpoint in the binary program code for each of the potential in-line synchronization instructions;
        setting page protection for affected memory pages to exec only, wherein a target processor for execution of the binary program code is configured with separate read and exec page protection;
        if a page access error occurs regarding a read on an address with one of the breakpoints, determining that the access is unrelated to an in-line synchronization instruction; and
        if one of the breakpoints is executed, determining that the potential in-line synchronization instruction corresponding to the executed breakpoint is a valid in-line synchronization instruction.

5. The method of claim 1,
    wherein determining whether neighboring potential instructions are valid instructions comprises following branches recursively to determine whether subsequent potential instructions are valid instructions.

6. A non-transitory, computer-accessible storage medium comprising program instructions for identifying in-line synchronization instructions in binary program code, wherein the program instructions are computer-executable to implement:
    scanning one or more executable segments of the binary program code to identify one or more potential in-line synchronization instructions; and
    determining whether each of the one or more potential in-line synchronization instructions is non-executable data or a valid in-line synchronization instruction, comprising, for each potential in-line synchronization instruction:
        determining whether each respective one of a plurality of neighboring potential instructions is a valid instruction or non-executable data, wherein the plurality of neighboring potential instructions are located in a segment of the binary program code including the respective potential in-line synchronization instruction;
        determining that the respective potential in-line synchronization instruction is a valid in-line synchronization instruction in response to determining that all of the plurality of neighboring potential instructions are valid instructions; and
        determining that the respective potential in-line synchronization instruction is non-executable data in response to determines that one or more of the neighboring potential instructions in the segment are valid instructions and one or more of the neighboring potential instructions occurring prior to the one or more valid instructions in the segment are non-executable data.

7. The non-transitory, computer-accessible storage medium of claim 6,
    wherein a target processor for execution of the binary program code is configured to execute variable-length instruction words;
    wherein identifying the one or more potential in-line synchronization instructions comprises determining that each of the one or more potential in-line synchronization instructions is within a graph of possible instructions for a corresponding candidate phrase in the binary program code.

8. The non-transitory, computer-accessible storage medium of claim 6, wherein the program instructions are further computer-executable to implement:
    for each valid in-line synchronization instruction:

setting a breakpoint in the binary program code;
evaluating an instruction data address when the breakpoint is encountered in execution of the binary program code; and
determining that the in-line synchronization instruction corresponding to the breakpoint is not a valid in-line synchronization instruction if the instruction data address is not in a shared memory segment.

9. The non-transitory, computer-accessible storage medium of claim 6, wherein the program instructions are further computer-executable to implement:
setting a breakpoint in the binary program code for each of the potential in-line synchronization instructions;
setting page protection for affected memory pages to exec only, wherein a target processor for execution of the binary program code is configured with separate read and exec page protection;
if a page access error occurs regarding a read on an address with one of the breakpoints, determining that the access is unrelated to an in-line synchronization instruction; and
if one of the breakpoints is executed, determining that the potential in-line synchronization instruction corresponding to the executed breakpoint is a valid in-line synchronization instruction.

10. A system comprising:
a processor; and
a memory coupled to the processor, wherein the memory stores program instructions which are executable by the processor to:
scan one or more executable segments of binary program code to identify one or more potential in-line synchronization instructions; and
determine whether each of the one or more potential in-line synchronization instructions is non-executable data or a valid in-line synchronization instruction, wherein, for each potential in-line synchronization instruction, the program instructions are executable by the processor to:
determine whether each respective one of a plurality of neighboring potential instructions is a valid instruction or non-executable data, wherein the plurality of neighboring potential instructions are located in a segment of the binary program code including the respective potential in-line synchronization instruction;
determine that the respective potential in-line synchronization instruction is a valid in-line synchronization instruction in response to determining that all of the plurality of neighboring potential instructions in the segment are valid instructions; and
determine that the respective potential in-line synchronization instruction is non-executable data in response to determining that one or more of the neighboring potential instructions in the segment are valid instructions and one or more of the neighboring potential instructions occurring prior to the one or more valid instructions in the segment are non-executable data.

11. The system of claim 10,
wherein a target processor for execution of the binary program code is configured to execute variable-length instruction words;
wherein in identifying the one or more potential in-line synchronization instructions, the program instructions are further executable by the processor to determine that each of the one or more potential in-line synchronization instructions is within a graph of possible instructions for a corresponding candidate phrase in the binary program code.

12. The system of claim 10, wherein the program instructions are further executable by the processor to:
for each valid in-line synchronization instruction:
set a breakpoint in the binary program code;
evaluate an instruction data address when the breakpoint is encountered in execution of the binary program code; and
determine that the in-line synchronization instruction corresponding to the breakpoint is not a valid in-line synchronization instruction if the instruction data address is not in a shared memory segment.

13. The system of claim 10, wherein the program instructions are further executable by the processor to:
set a breakpoint in the binary program code for each of the potential in-line synchronization instructions;
set page protection for affected memory pages to exec only, wherein a target processor for execution of the binary program code is configured with separate read and exec page protection;
if a page access error occurs regarding a read on an address with one of the breakpoints, determine that the access is unrelated to an in-line synchronization instruction; and
if one of the breakpoints is executed, determine that the potential in-line synchronization instruction corresponding to the executed breakpoint is a valid in-line synchronization instruction.

\* \* \* \* \*